(12) United States Patent
Adachi et al.

(10) Patent No.: US 7,744,439 B2
(45) Date of Patent: Jun. 29, 2010

(54) IMAGE DISPLAY DEVICE AND MANUFACTURING METHOD OF THE SAME

(75) Inventors: Daisuke Adachi, Kameoka (JP); Hiroyasu Tsuji, Sennan-gun (JP); Keisuke Sumida, Hirakata (JP)

(73) Assignee: Panasonic Corporation, Osaka (JP)

( * ) Notice: Subject to any disclaimer, the term of this patent is extended or adjusted under 35 U.S.C. 154(b) by 594 days.

(21) Appl. No.: 11/783,849

(22) Filed: Apr. 12, 2007

(65) Prior Publication Data

US 2007/0209394 A1    Sep. 13, 2007

Related U.S. Application Data

(62) Division of application No. 10/499,119, filed as application No. PCT/JP03/15124 on Nov. 27, 2003, now Pat. No. 7,495,393.

(30) Foreign Application Priority Data

Nov. 29, 2002    (JP)    ............... 2002-347189

(51) Int. Cl.
*H01J 9/24*    (2006.01)
(52) U.S. Cl. ...................................... 445/24
(58) Field of Classification Search ............ 445/24, 445/25

See application file for complete search history.

(56) References Cited

U.S. PATENT DOCUMENTS

| | | |
|---|---|---|
| 4,113,896 A | 9/1978 | Keiner et al. |
| 6,100,633 A * | 8/2000 | Okumura et al. ............ 313/486 |
| 2001/0015621 A1 * | 8/2001 | Oniki ........................ 313/582 |

FOREIGN PATENT DOCUMENTS

| | | |
|---|---|---|
| JP | 60-107547 | 6/1985 |
| JP | 10-144208 | 5/1998 |
| JP | 10-255669 | 9/1998 |
| JP | 11-67101 | 3/1999 |
| JP | 11-144623 | 5/1999 |
| JP | 11-246238 | 9/1999 |
| JP | 2000-169764 | 6/2000 |
| JP | 2002-298744 | 10/2002 |
| JP | 2002-324483 | 11/2002 |

OTHER PUBLICATIONS

"Glass Substrate PD200", Asahi Glass Co. Ltd., 2001 FPD Technology Outlook pp. 706-707.

* cited by examiner

*Primary Examiner*—Toan Ton
*Assistant Examiner*—Hana A Sanei
(74) *Attorney, Agent, or Firm*—Wenderoth, Lind & Ponack, L.L.P.

(57) ABSTRACT

The present invention provides an image display device capable of displaying a good image by suppressing yellowing of a glass substrate, and a high-yield manufacturing method of the glass substrate. The image display device is formed of a front-side glass substrate and a back-side glass substrate. In this manufacturing method, a glass substrate is used as the front-side glass substrate when Sn++ content in the glass substrate is a predetermined value or less, and the glass substrate is used as the back-side glass substrate when the Sn++ content exceeds the predetermined value.

1 Claim, 6 Drawing Sheets

IMAGE DISPLAY DEVICE AND MANUFACTURING METHOD OF THE SAME

This is a divisional application of Ser. No. 10/499,119, filed Jun. 17, 2004 now U.S. Pat. No. 7,495,393, which is the National Stage of PCT/JP2003/015124, filed Nov. 27, 2003.

TECHNICAL FIELD

The present invention relates to an image display device such as a plasma display panel (PDP) and a manufacturing method thereof.

BACKGROUND ART

There are various types of image display devices for displaying a high definition television image on a large screen. PDPs belong to one of the various types. A PDP is hereinafter described as an example.

A PDP is formed of two glass substrates: a front-side glass substrate for displaying an image; and a back-side glass substrate facing the front-side glass substrate. The front-side glass substrate has the following elements:
- a display electrode that is formed on one principal surface thereof and includes a stripe-like transparent electrode and a bus electrode;
- a dielectric film that covers the display electrode and works as a capacitor; and
- an MgO protective layer formed on the dielectric film.

The back-side glass substrate has the following elements:
- a stripe-like address electrode formed on one principal surface thereof;
- a dielectric film for covering the address electrode;
- barrier ribs formed on the dielectric film; and
  - phosphor layers that are formed between the barrier ribs and emit red light, green light, and blue light, respectively.

As the front-side glass substrate and the back-side glass substrate, glass substrates are used that are easily increased in area, have high flatness, are inexpensive, and are manufactured by a float method. These glass substrates are disclosed in Electronic Journal, Separate Volume "2001, FPD Technology Outlook" (Electronic Journal Co. Ltd. Oct. 25, 2000, p 706-p 710).

The float method is a method of forming plate-shaped glass by floating and conveying molten glass material onto molten metallic tin under reducing atmosphere. An inexpensive glass sheet having large area can be precisely manufactured in the float method, so that the float method is in widespread use in manufacturing of a window glass or the like.

When an Ag electrode made of metallic silver (Ag) material is formed on a float glass substrate (this is hereinafter called a glass substrate) manufactured by the float method, however, a colored layer is disadvantageously formed on the surface of the glass substrate and the glass substrate changes into yellow (yellows).

This coloring phenomenon of the glass substrate by the Ag electrode is caused by the following processes:
- a silver colloid is generated by oxidation-reduction reaction between reducing bivalent tin ions ($Sn^{++}$) existing on the glass substrate and silver ions ($Ag^+$); and
- light absorption therefore occurs near wavelength of 350 to 450 nm.

In other words, the glass substrate is exposed to the reducing atmosphere containing hydrogen in a molding process in a float furnace as a molten metallic tin bath. A reducing layer with a thickness of several μm containing $Sn^{++}$ of the molten tin (Sn) is generated on the surface of the glass substrate. When a bus electrode including an Ag electrode is formed on the glass substrate having the reducing layer on its surface, $Ag^+$ separates from the bus electrode, and infiltrates into the glass due to ion exchange with alkali metal ions contained in the glass. The infiltrating $Ag^+$ is reduced by $Sn^{++}$ existing in the reducing layer to generate metallic silver (Ag) colloid. The metallic silver (Ag) colloid yellows the glass substrate. The yellowing occurs also on the front-side glass substrate having the bus electrode on the transparent electrode.

When the glass substrate, especially the front-side glass substrate, yellows, the yellowing is fatal in the image display device. Due to the yellowing of the glass substrate, the panel looks yellow, the commercial value decreases, display brightness of blue decreases to change display chromaticity, and color temperature decreases to degrade picture quality especially in displaying white.

These problems occur not only in a PDP but also in a general image display device having a structure where an Ag electrode is formed on a glass substrate.

The present invention addresses the problems described above. The present invention provides an image display device allowing good image display by using a glass substrate apt to yellow especially as the back-side glass substrate, of the front-side glass substrate and the back-side glass substrate. The present invention provides a manufacturing method of the image display device.

SUMMARY OF THE INVENTION

An image display device of the present invention, for addressing the problems described above, has a front-side glass substrate and a back-side glass substrate. A glass substrate having $Sn^{++}$ content exceeding a predetermined value is used as the back-side glass substrate.

Thanks to this structure, when an electrode made of Ag material is formed on the glass substrate manufactured by the float method, a glass substrate apt to yellow is used as the back-side glass substrate. Therefore, an image display device having high image display quality can be provided.

In the manufacturing method of the present invention, an image display device including a front-side glass substrate and a back-side glass substrate is manufactured. When the content of $Sn^{++}$ on the surface of a glass substrate on which an Ag electrode is to be formed is a predetermined value or less, the glass substrate is used as the front-side glass substrate. When the content of $Sn^{++}$ exceeds the predetermined value, the glass substrate is used as the back-side glass substrate.

In this method, when an image display device is manufactured by forming an electrode made of Ag material on a glass substrate manufactured by the float method, a glass substrate apt to yellow is used as the back-side glass substrate. This method thus allows manufacturing of an image display device having high image display quality.

DETAILED DESCRIPTION OF PREFERRED EMBODIMENTS

An exemplary embodiment of the present invention will be described with reference to the drawings.

A PDP is hereinafter described as an example of image display devices. However, the present invention is also useful for an image display device having a structure where an electrode made of Ag material is disposed on a glass substrate that is manufactured by the float method and has $Sn^{++}$ on its surface.

Figure 1:
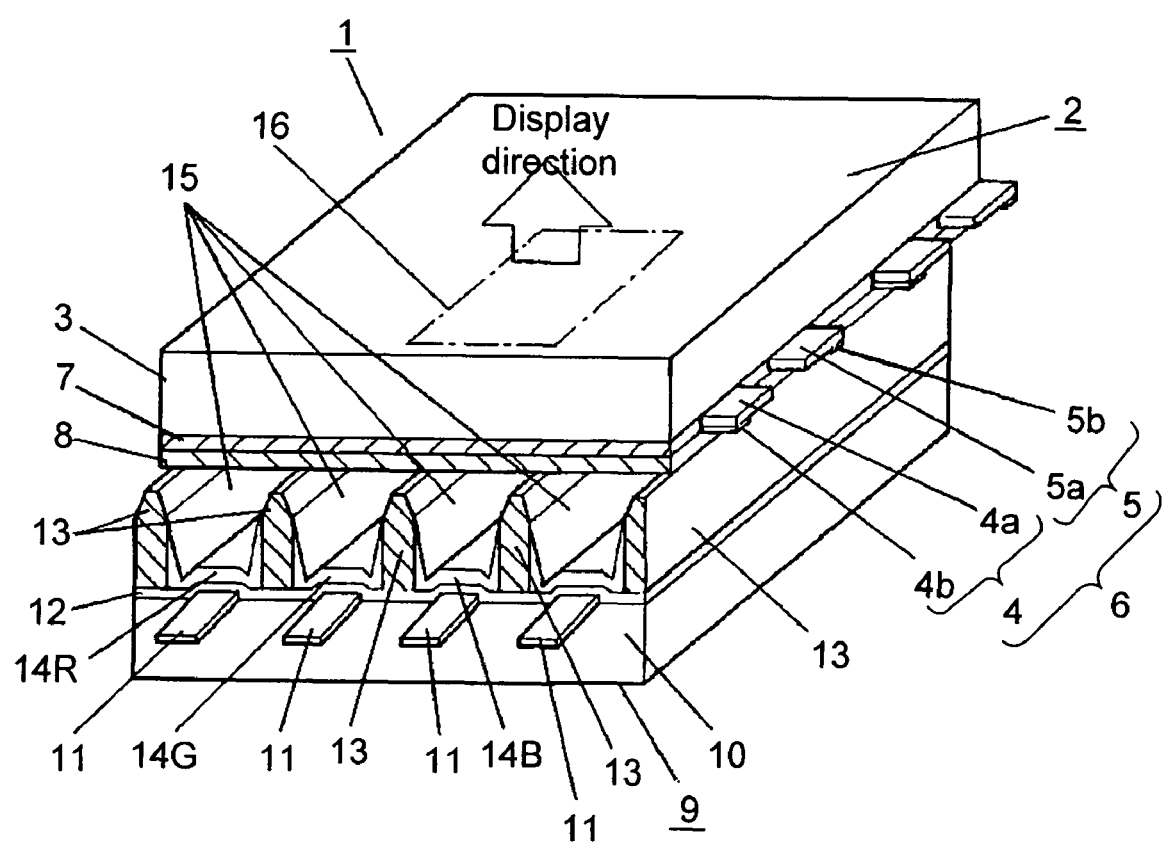
FIG. 1 is a sectional and perspective view showing a schematic structure of a PDP as an image display device in accordance with an exemplary embodiment of the present invention.

FIG. 1 is a sectional and perspective view showing a schematic structure of the PDP. PDP 1 is formed of two glass substrates: front-side glass substrate 3 for displaying an image; and back-side glass substrate 10 facing the front-side glass substrate.

Front substrate 2 of PDP 1 has the following elements:
  display electrodes 6 that are formed on one principal surface of front-side glass substrate 3 and include scan electrode 4 and sustain electrode 5;
  dielectric layer 7 for covering display electrodes 6; and
  protective layer 8, made of MgO for example, for covering dielectric layer 7.

In scan electrode 4 and sustain electrode 5, for decreasing electric resistance, bus electrodes 4b and 5b made of Ag material are laminated on transparent electrodes 4a and 5a, respectively.

Back substrate 9 has the following elements:
  address electrodes 11, made of Ag material, formed on one principal surface of back-side glass substrate 10;
  dielectric layer 12 for covering address electrodes 11;
  barrier ribs 13 formed on dielectric layer 12 at positions corresponding to clearances between address electrodes 11; and
  phosphor layers 14R, 14G, and 14B between barrier ribs 13.

Front substrate 2 faces back substrate 9 with barrier ribs 13 sandwiched in between so that display electrodes 6 are orthogonal to address electrodes 11, and the outer periphery of the image display region is sealed by a sealing member. Discharge spaces 15 formed between front substrate 2 and back substrate 9 are filled with discharge gas such as Ne—Xe 5% at pressure of 66.5 kPa (500 Torr).

Crossing parts between display electrodes 6 and address electrodes 11 in discharge spaces 15 work as discharge cells 16 (unit light emitting regions).

As front-side glass substrate 3 and back-side glass substrate 10, glass substrates are used that are easily increased in area, have high flatness, are inexpensive, and are manufactured by a float method.

In the structure discussed above, bus electrodes 4b and 5b on front-side glass substrate 3 are formed of Ag electrodes. If front-side glass substrate 3 contains $Sn^{++}$, the glass substrate yellows even when each of transparent electrodes 4a and 5a is interposed between each of bus electrodes 4b and 5b and glass substrate 3. Depending on the degree of the yellowing, an image display characteristic of the image display device is adversely affected.

Front-side glass substrate 3 of PDP 1, namely an image display device, is analyzed to determine $Sn^{++}$ content on the surface thereof. Here, bus electrodes 4b and 5b containing Ag are to be formed on front-side glass substrate 3. Back-side glass substrate 10 is also analyzed to determine $Sn^{++}$ content on the surface thereof. Here, address electrodes 11 containing Ag are to be formed on back-side glass substrate 10.

Specifically, reflectance of the glass substrate at the wavelength of 220 nm is measured, and the analysis is performed based on the reflectance. This method is provided based on inventors' study. The inventors found the following facts:
  the reflectance near the wavelength of 220 nm increases with increase in $Sn^{++}$ content on the glass substrate; and
  there is a correlation between the reflectance near the wavelength of 220 nm and coloring of the glass substrate by silver colloid.

Here, the reflectance may be measured by a general measuring device.

The $Sn^{++}$ content on the glass substrate is determined by a secondary ion-mass spectrometry (SIMS) or an inductively-coupled plasma (ICP) optical emission spectrometry. A predetermined value as an allowance of $Sn^{++}$ content against yellowing is determined based on a calibration curve derived from the relation between the $Sn^{++}$ content determined by the spectrometry and the measured reflectance. The allowance of $Sn^{++}$ content can be therefore determined from the reflectance without breaking the glass substrate.

Figure 2:
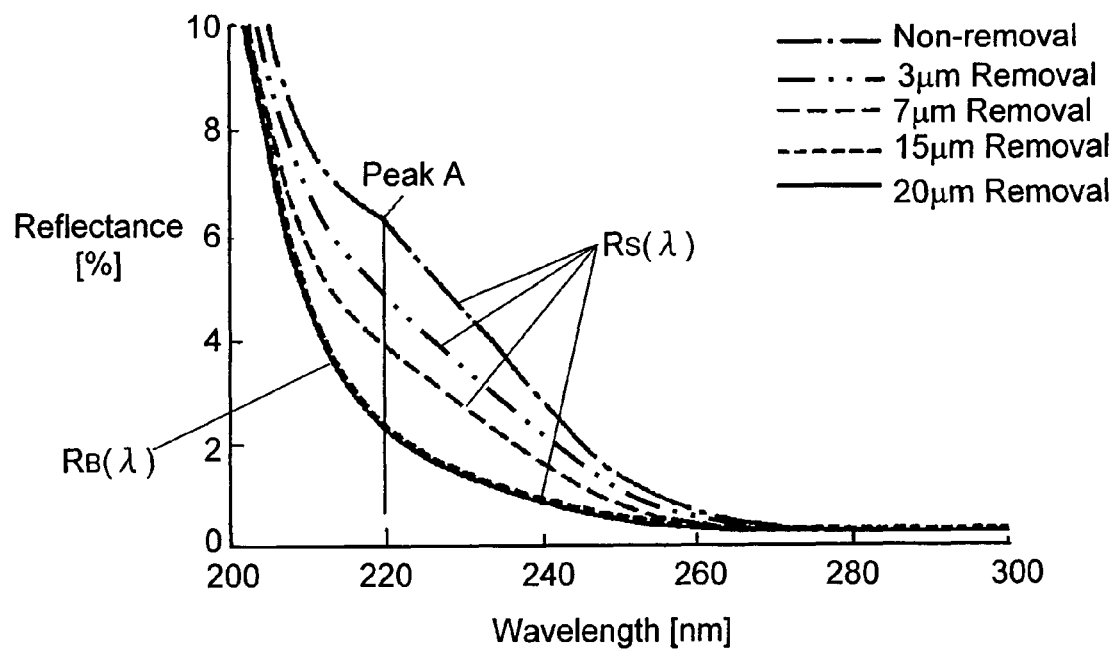
FIG. 2 is a graph showing a relation between a surface removing amount and a reflection spectrum of a glass substrate manufactured by a float method.

Firstly, the surface on the non-contact side with tin (top surface) of the glass substrate manufactured by the float method is uniformly removed by thickness of 3, 7, 15, or 20 μm, and reflection spectrum of the remaining glass substrate is measured at a wavelength of 200 to 300 nm. The measurement result is shown in FIG. 2. FIG. 2 also shows a measurement result of a glass substrate without removal for comparison. The reason why the top side surface is removed is as follows. Adhesion and diffusion amounts of tin are less and hence the yellowing degree is lower on the top-side surface than the bottom-side surface (contact side with tin), so that a bus electrode made of Ag material is generally formed on the top-side surface. When the Ag electrode is formed on the bottom side, the coloring degree is two or three times higher than that in the case that the Ag electrode is formed on the top side.

FIG. 2 shows that, when removed thickness is 15 μm or less, reflectance at peak A near the wavelength of 220 nm decreases with increase of the removed thickness. When removed thickness is 15 μm or more, the decrease of the reflectance stops. It is considered that $Sn^{++}$ content monotonously decreases in the depth direction from the top side of the glass substrate. The result shown in FIG. 2 matches with the consideration, and hence the decrease of the reflectance at peak A is considered to match with the decrease of $Sn^{++}$ content.

Figure 3:
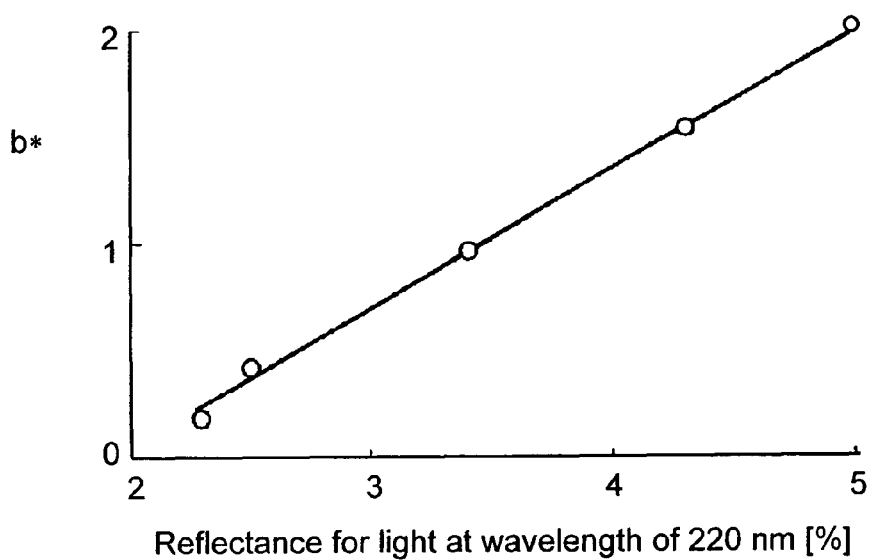
FIG. 3 is a graph showing a relation between reflectance at the wavelength of 220 nm and coloring degree of glass.

Next, for clarifying a relation between the peak near the wavelength of 220 nm appearing in the reflection spectrum and yellowing of the glass substrate, an Ag electrode is actually formed on the glass substrate and coloring degree of the glass substrate is measured. In other words, 5 μm thick silver paste as the Ag electrode is applied onto the glass substrate by screen printing, they are calcined at 600° C., and a relation between the coloring degree of the glass substrate and reflectance at the wavelength of 220 nm is investigated. FIG. 3 shows the investigation result. The coloring degree of the glass substrate is evaluated using b * in an L * a * b * color system (JIS Z 8729). The larger b * value is, the higher the degree of yellowing is. The coloring degree of the glass substrate is measured from the side having no Ag electrode. As shown in FIG. 3, the reflectance of light at the wavelength of 220 nm on the glass substrate and the coloring degree b * of the glass substrate are directly proportional.

The investigation result discussed above shows that increase of the reflectance of the glass substrate at the wavelength of 220 nm has a correlation to the $Sn^{++}$ content in the glass substrate, namely content of reducing material at least causing yellowing. Therefore, by measuring the reflectance at the wavelength of 220 nm, the $Sn^{++}$ content in the glass substrate on which the Ag electrode is to be formed can be analyzed based on the calibration curve, and the degree of yellowing of the glass substrate can be also estimated.

Figure 4:
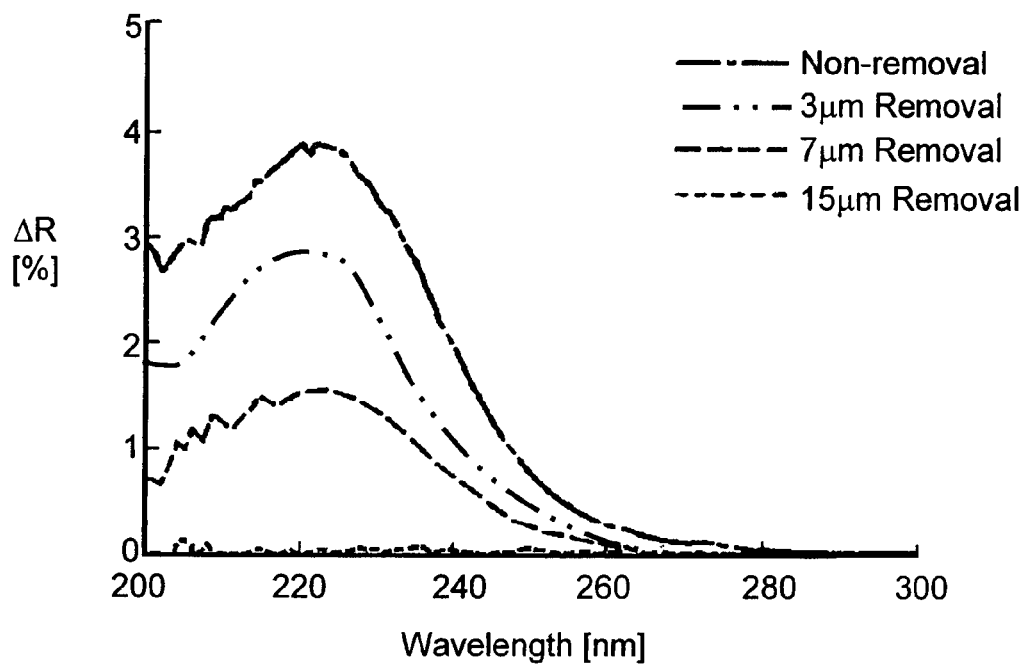
FIG. 4 is a graph showing difference ΔR between reflection spectrum $R_S(\lambda)$ of the glass substrate and reflection spectrum $R_B(\lambda)$ in a nonexistent state of $Sn^{++}$.

In FIG. 2, after 15 μm or more thick glass substrate is removed, the reflectance (about 2%) near the wavelength of 220 nm is not resulted from existence of $Sn^{++}$ but from bottom part of a reflection spectrum having a peak at another wavelength. The stop of the decrease of the reflectance at the wavelength of 220 nm is considered to be caused by decrease of the $Sn^{++}$ content in the glass substrate. FIG. 4 shows difference $\Delta R(\lambda)=R_S(\lambda)-R_B(\lambda)$. Here, $R_S(\lambda)$ is a reflection spectrum of the glass substrate shown in FIG. 2, and $R_B(\lambda)$ is a reflection spectrum in a nonexistent state of $Sn^{++}$, namely in a state where the removal of 15 μm or more thick glass substrate stops the decrease of the reflectance. Reflection spectrum difference $\Delta R$ is considered to indicate the existence of $Sn^{++}$.

Figure 5:
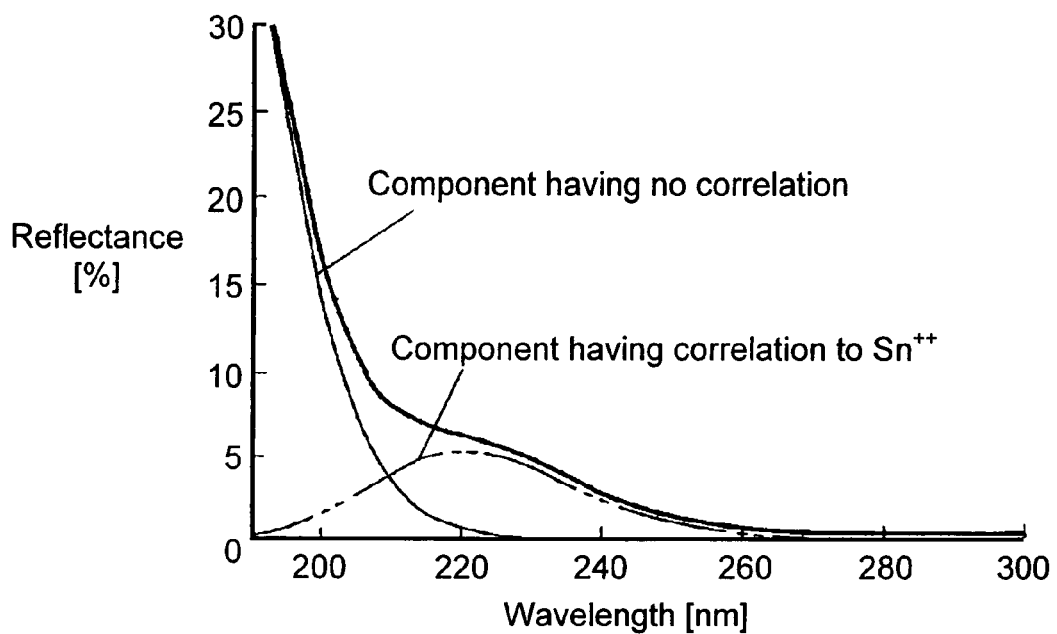
FIG. 5 is a graph showing an analyzing result of the reflection spectrum of the glass substrate.

The reflectance at the wavelength of 220 nm may be read from a reflection spectrum distribution as shown in FIG. 2. However, for more precisely evaluating signal strength of the reflection spectrum having a correlation to $Sn^{++}$, the following method can be used. Reflection spectrum is measured in a wider range of wavelength, for example 180 to 280 nm. The measured reflection spectrum is then divided into two Gaussian peaks of a component having a correlation to $Sn^{++}$ and a component having no correlation to $Sn^{++}$ shown in FIG. 5 by a curve fitting method using $$M1\exp\left\{-\frac{(1240/\lambda - 1240/M2)^2}{M3^2}\right\} + M4\exp\left\{-\frac{(1240/\lambda - 1240/M5)^2}{M6^2}\right\}. \quad (Eq. 1)$$

Where, λ is a wavelength (nm), and M1 to M6 are fitting parameters. For various glass substrates, the peak areas of respective components having a correlation to $Sn^{++}$ are compared with each other.

The lower limit of the measured wavelength range is set at 180 nm because oxygen in atmospheric air absorbs light at a wavelength lower than 180 nm, hence a vacuum or atmosphere containing no oxygen is required for measurement, and construction of a measuring system and measurement requires much effort.

The position of the wavelength of the peak of the reflectance caused by $Sn^{++}$ can slightly change depending on the manufacturing condition and the composition of the glass substrate. Therefore, for increasing analysis accuracy of $Sn^{++}$, it is more effective to analyze not only the reflectance at the wavelength of 220 nm but also the bottom part of the reflectance extending to a wider wavelength range, for example 200 to 250 nm.

Figure 6:
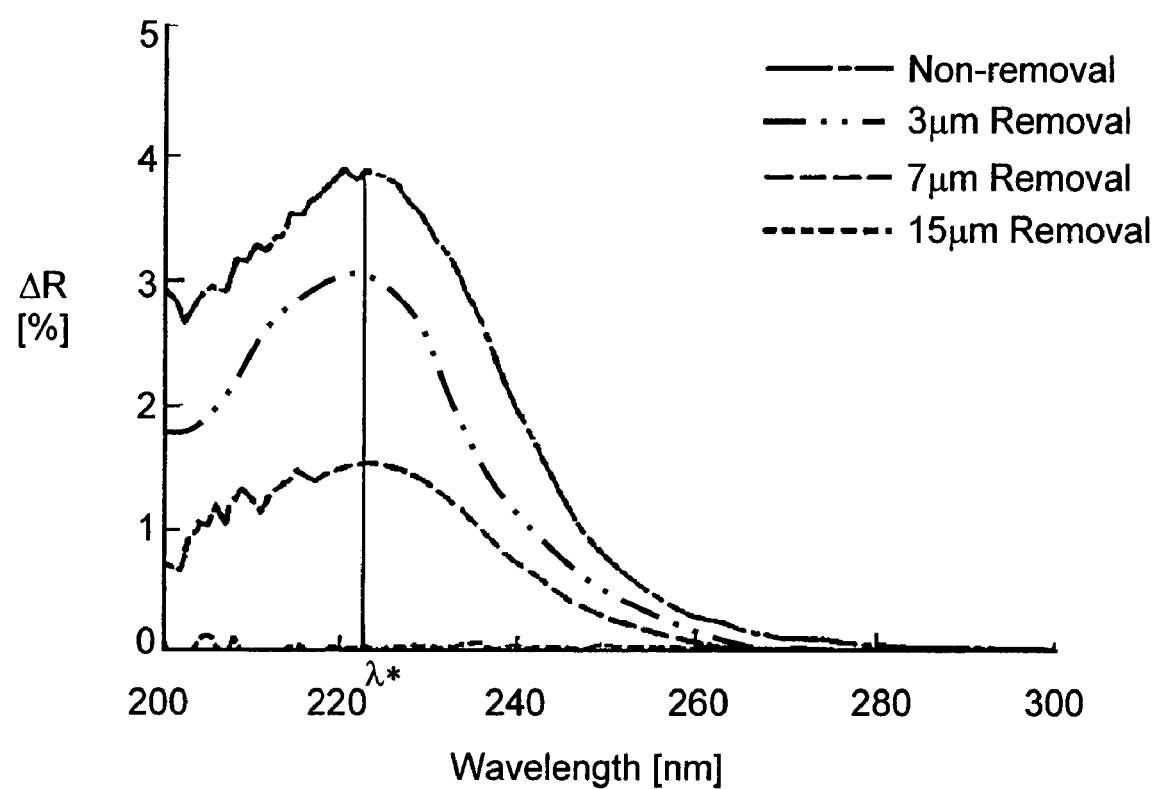
FIG. 6 is a graph illustrating wavelength $\lambda^*$ maximizing difference ΔR between reflection spectrum $R_S(\lambda)$ of the glass substrate and reflection spectrum $R_B(\lambda)$ in a nonexistent state of $Sn^{++}$.

Wavelength λ* maximizing difference $\Delta R(\lambda)=R_S(\lambda)-R_B(\lambda)$ in a wavelength range of 200 to 250 nm is considered to indicate the existence of $Sn^{++}$, as shown in FIG. 6. Here, $R_S(\lambda)$ is a reflection spectrum of the glass substrate, and $R_B(\lambda)$ is a reflection spectrum in a nonexistent state of $Sn^{++}$. In FIG. 6, λ* maximizing $R_B(\lambda)$ is additionally written in FIG. 4. $Sn^{++}$ content in the glass substrate is analyzed based on the reflectance $R_S(\lambda^*)$ at wavelength λ* or reflectance difference $\Delta R(\lambda^*)=R_S(\lambda^*)-R_B(\lambda^*)$.

The reflectance difference $\Delta R(\lambda^*)=R_S(\lambda^*)-R_B(\lambda^*)$ means the maximum value of $\Delta R(\lambda)=R_S(\lambda)-R_B(\lambda)$. Here, $R_S(\lambda)$ is a reflection spectrum of the glass substrate at wavelength of 200 to 250 nm, and $R_B(\lambda)$ is a reflection spectrum in a nonexistent state of $Sn^{++}$.

$Sn^{++}$ locally exists only in a region from the outermost surface of the glass substrate to depth of about 15 μm, as shown in FIG. 2. Therefore, reflection spectrum on the glass substrate of which top part having thickness of 15 μm or more, preferably 20 μm or more, is removed can be set as reflection spectrum $R_B(\lambda)$ in the nonexistent state of $Sn^{++}$.

Another specific method of analyzing reflection spectrum also including the extending bottom part of the reflection spectrum is provided as follows. A mean reflectance is determined by area integral of reflection spectrum at the wavelength of 200 to 250 nm, for example, and $Sn^{++}$ content is analyzed.

Either of the methods discussed above is useful for evaluating whether or not a selected glass substrate is optimum for an image display device.

A judgment standard for the analysis result of the $Sn^{++}$ content on the surface of the glass substrate on which the Ag electrode is to be formed is described hereinafter.

Existence of $Sn^{++}$ reduces $Ag^+$ of the Ag electrode to generate Ag colloid, and the glass substrate yellows. The coloring (yellowing) degree of the glass substrate is determined based on the $Sn^{++}$ content, so that the allowance, namely the predetermined value, of the $Sn^{++}$ content is a judgment standard when the glass substrate is used for an image display device.

As shown in the result of FIG. 2, for preventing the yellowing, it is preferable that the following parameter is smaller:

reflectance at a wavelength indicating existence of $Sn^{++}$, such as reflectance $R_S(220)$ at the wavelength of 220 nm;

reflectance $R_S(\lambda^*)$ at wavelength λ* maximizing reflection spectrum difference $\Delta R(\lambda)=R_S(\lambda)-R_B(\lambda)$;

reflectance difference $\Delta R(\lambda^*)=R_S(\lambda^*)-R_B(\lambda^*)$; or mean reflectance $R_{S-mean}$ (200-250) at wavelength of 200 to 250 nm.

Specifically, reflectance $R_S(220)$ is 5% or less, reflectance $R_S(\lambda^*)$ is 5% or less, reflectance difference $\Delta R(\lambda^*)$ is 3% or less, or mean reflectance $R_{S-mean}$ (200-250) is 5% or less.

In this case, it is verified that the $Sn^{++}$ content is so low that the yellowing of the glass substrate presents no problem even when an image display device is manufactured by forming an Ag electrode on the glass substrate satisfying the condition discussed above. An image display device having high image display quality is therefore manufactured, by using this glass substrate as the front-side glass substrate and using a glass substrate that does not satisfy the condition as the back-side glass substrate.

However, the low $Sn^{++}$ content in the glass substrate can be caused by weak reducing force of the atmosphere in a float furnace. In this case, disadvantageously, metallic tin in a tin bath continuously oxidizes and volatilizes in manufacturing the glass substrate. Too low $Sn^{++}$ content in the glass substrate is not preferable in manufacturing the glass substrate.

It is therefore preferable that reflectance $R_S$ (220) is between 2.5% and 5%, reflectance $R_S(\lambda^*)$ is between 2.5% and 5%, reflectance difference $\Delta R(\lambda^*)$ is between 0.5% and 3%, or mean reflectance $R_{S-mean}$ (200-250) is between 2.5% and 5%.

When a measured reflectance of the glass substrate exceeds the range discussed above, $Sn^{++}$ content exceeds an allowance where yellowing of the glass substrate is prevented from affecting the image display. In this case, when an image display device is manufactured by forming an Ag electrode on the glass substrate, yellowing producing a defect in the image display device occurs.

When the $Sn^{++}$ content is determined to exceed the allowance, the reducing force in a float furnace is weakened in manufacturing the glass substrate, and the $Sn^{++}$ content of the glass substrate is decreased. For weakening the reducing force in the float furnace, specially, hydrogen concentration in the float furnace is deceased. Mixed gas of hydrogen and nitrogen is generally used as atmospheric gas in the float furnace. The mixed gas contains 2 to 10 vol % of hydrogen. The reducing force is controlled by changing hydrogen concentration in this hydrogen concentration range in response to the allowance of the $Sn^{++}$ content.

Figure 7:
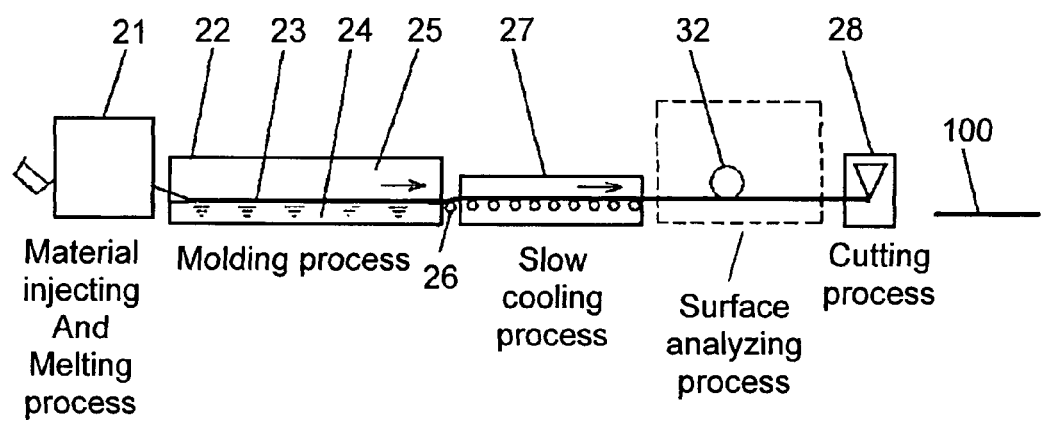
FIG. 7 is a schematic block diagram of a manufacturing apparatus of the glass substrate for the image display device in accordance with the exemplary embodiment of the present invention.

FIG. 7 shows a manufacturing apparatus of the glass substrate. A manufacturing method of the glass substrate is described.

Material for the glass substrate is injected into melting furnace 21, heated to a high temperature to be molten, and then supplied to float furnace 22. Float furnace 22 has molten tin 24 in its lower part, and has reducing atmosphere 25 (mixed gas of hydrogen and nitrogen) in its upper space for preventing oxidation of tin. Molten glass is continuously moved on molten tin 24 and molded as plate-like glass ribbon 23. Glass ribbon 23 is lifted up from the tin bath and moved to slow cooling furnace 27 by conveying roller 26. Distortion occurring during the molding is decreased by slowly cooling glass ribbon 23 in slow cooling furnace 27.

After the slow cooling process, a surface analyzing process of measuring reflectance with reflectance measuring device 32 and analyzing the $Sn^{++}$ content of the glass substrate is performed in the manufacturing apparatus in FIG. 7. Reflectance measuring device 32 measures the following parameter:

reflectance at a wavelength indicating existence of $Sn^{++}$ in the glass substrate, such as reflectance $R_S(220)$ at the wavelength of 220 nm;

reflectance $R_S(\lambda^*)$ at wavelength $\lambda^*$ maximizing $\Delta R(\lambda)$ = $R_S(\lambda) - R_B(\lambda)$;

reflectance difference $\Delta R(\lambda^*) = R_S(\lambda^*) - R_B(\lambda^*)$; or mean reflectance $R_{S-mean}$(200-250) at wavelength of 200 to 250 nm.

When the $Sn^{++}$ content is determined to exceed the allowance based on the measured reflectance, concentration of the atmosphere gas is controlled to weaken the reducing force in float furnace 22. For preventing yellowing, it is preferable that the reflectance is as low as possible. While, when the reducing force of atmosphere 25 in float furnace 22 is excessively weakened for reducing the $Sn^{++}$ content in the glass substrate, disadvantageously, metallic tin contained in molten tin 24 continuously oxidizes and volatilizes in manufacturing the glass substrate.

Therefore, when the reflectance corresponding to the $Sn^{++}$ content in the glass substrate is higher than the allowance value discussed above, the hydrogen concentration of the atmosphere in the float furnace is controlled to be decreased. When the reflectance is lower than the allowance value, the hydrogen concentration is preferably increased for preventing oxidation of the metallic tin.

This reflectance measurement can be performed nondestructively, in a non-contact matter, and in a short time, so that the measurement is applicable also to a process control of a manufacturing process of a glass substrate. The image display device is especially required to be uniform on its surface, so that the reflectance is preferably measured at a plurality of positions for recognizing dispersion on the glass substrate.

The $Sn^{++}$ content can be evaluated by the secondary ion-mass spectrometry (SIMS) or the inductively-coupled plasma (ICP) optical emission spectrometry. However, these methods are destructive inspections and can be hardly used for measurement on a large area, so that the methods are inappropriate for in-line measurement of $Sn^{++}$ content in a glass substrate in the glass substrate manufacturing process. When $Sn^{++}$ content in a predetermined sample is measured using the methods, reflectance of the sample is measured, and a calibration curve is prepared, however, $Sn^{++}$ content can be determined based on the reflectance.

When hydrogen concentration of the atmosphere in the float furnace increases, reducing property of the atmosphere is increased to increase the $Sn^{++}$ content of the glass substrate, and the yellowing of the glass substrate presents a problem, as discussed above. The variation in the $Sn^{++}$ content of the glass substrate appears as difference in yellowing degree of the glass substrate, so that this variation must be within a certain range. When the reflectance of the glass substrate is higher than the predetermined range discussed above, the hydrogen concentration in the float furnace is decreased. The decreasing weakens the reducing property of the atmosphere, so that the reflectance of the glass substrate can be decreased.

After the surface analyzing process of measuring reflectance, in a cutting process, glass ribbon 23 is cut into an arbitrary size by a cutter 28 and glass substrate 100 is produced.

Figure 8:
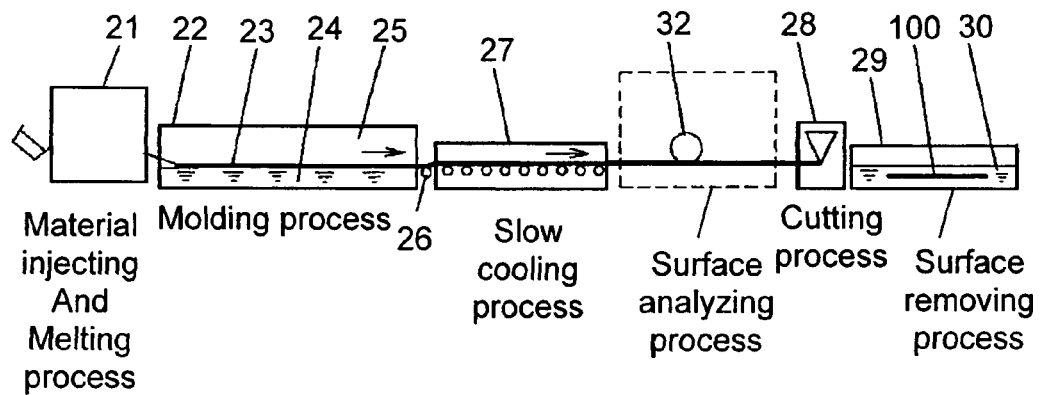
FIG. 8 is a schematic block diagram of another manufacturing apparatus of the glass substrate for the image display device in accordance with the exemplary embodiment.

Though the reducing force in float furnace 22 is controlled to weaken, the analyzed $Sn^{++}$ content of the glass substrate on which an Ag electrode is to be formed sometimes exceeds the allowance. In this case, as shown in FIG. 8, the Ag electrode receiving surface of the glass substrate is partially removed until the $Sn^{++}$ content becomes within the allowance in surface removing furnace 29 in a surface removing process. In other words, by controlling the reducing force in float furnace 22 to weaken and by partially removing the surface of the glass substrate, the surface of the glass substrate formed so as to have decreased $Sn^{++}$ content is further partially removed. In this case, removed thickness can be decreased comparing with the case that the surface is partially removed without controlling the reducing force in float furnace 22. When the reducing force in float furnace 22 is not controlled, as shown in FIG. 2, $Sn^{++}$ exists in a range from the glass surface to depth of about 15 μm. For thoroughly removing $Sn^{++}$, the glass substrate having a large area must be uniformly removed by a thickness of 15 μm or more, preferably 20 μm or more. This removing process requires mirror finish, and increasing the removed thickness increases cost extremely, so that decrease of the removed thickness is extremely economical.

The surface removing process may employ a chemical method or a physical method. In the chemical method, the glass substrate surface is etched by dipping glass substrate 100 into etchant 30 such as aqueous hydrofluoric acid or aqueous sodium hydroxide. The physical method includes a buffing method or a sand blasting method. Sufficient surface removing thickness is about 3 to 15 μm, as shown by the study of the reflectance.

Figure 9:
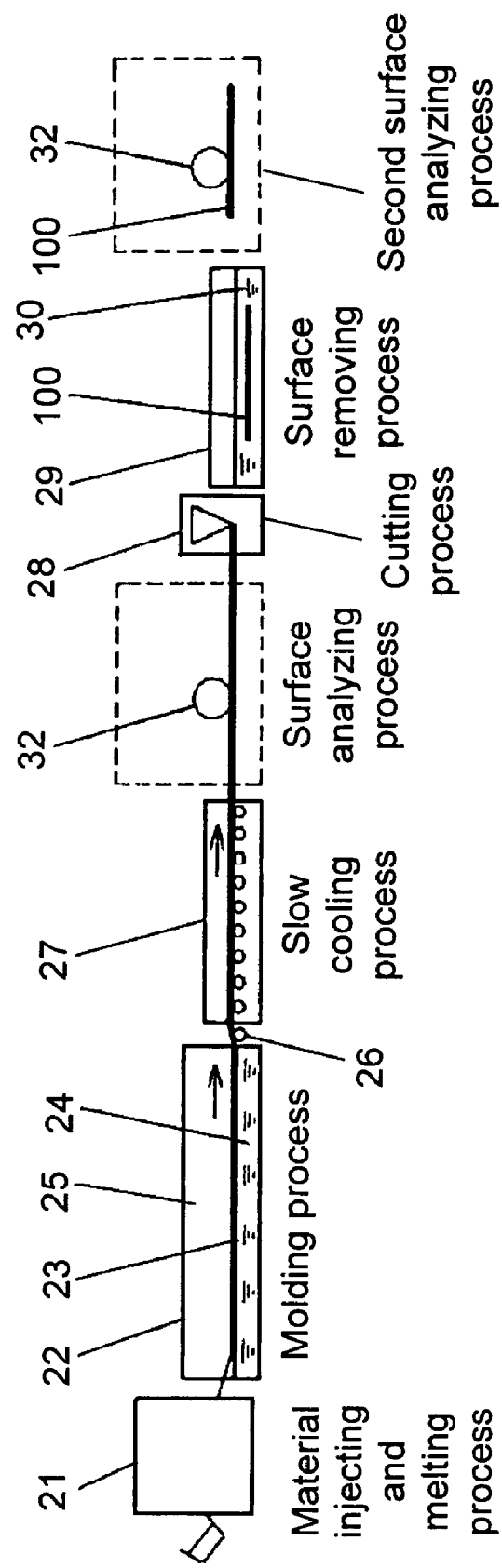
FIG. 9 is a schematic block diagram of still another manufacturing apparatus of the glass substrate for the image display device in accordance with the exemplary embodiment.

In a method shown in FIG. 9, surface removal is performed in surface removing furnace 29, $Sn^{++}$ content in glass substrate 100 is analyzed again by reflectance measuring device 32 in a second surface analyzing process, and surface removal is performed again if necessary. Thus, the surface analyzing process and the surface removing process are repeated and the surface state of the glass substrate is severely controlled, thereby further increasing the advantage of the present invention.

When the $Sn^{++}$ content in the glass substrate is determined to be higher than the allowance, the glass substrate is used as a back-side glass substrate of an image display device. When the $Sn^{++}$ content in the glass substrate is determined to be not higher than the allowance, the glass substrate is used as a front-side glass substrate of an image display device. Reducing atmosphere is not required to be controlled for all glass substrates, and decrease of processes, such as dispensing with the surface removing process, is allowed, thereby improving yield of manufacturing of a glass substrate as a whole.

When a PDP is the image display device manufactured using the glass substrate formed as discussed above, the PDP does not generate yellowing that is so strong as to affect the image display characteristic, and can sufficiently display an image.

An investigation result of the PDP manufactured in accordance with the present invention is described.

The surface of a glass substrate (PD-200 manufactured by Asahi Glass Co. Ltd.) manufactured by the float method is partially removed so that various amount of the reducing layer remains on the surface of the glass substrate. In other words, a maximum value of $\Delta R(\lambda)=R_S(\lambda)-R_B(\lambda)$, namely difference between reflection spectrum $R_S(\lambda)$ and reflection spectrum $R_B(\lambda)$ in a wavelength range of 210 to 250 nm, is 0.1%, 0.8%, 2.1%, 3.3%, or 4.0%. Specifically, surface removal is performed by dipping the glass substrate into etchant composed of aqueous hydrofluoric acid (10%), and the surface removing thickness is controlled using the dipping period. When temperature of the aqueous hydrofluoric acid is set at 27° C., etching speed is 2 μm/min. After the dipping for a predetermined period, the glass substrate is washed. Then, reflection spectrum is measured. The glass substrate discussed above is used as the front-side glass substrate, and a glass substrate for which $\Delta R(\lambda)$ exceeds 3% is used as the back-side glass substrate.

Using these glass substrates, three kinds of PDPs having different resolution and structure are manufactured, and a relation between reflection spectrum difference $\Delta R(\lambda)$ and coloring degree (b *) by yellowing of the PDPs is evaluated.

PDP111 corresponds to video graphics array (VGA) (480× 640 pixel), and has a transparent electrode between an Ag electrode (bus electrode) and a glass substrate. PDP222 corresponds to extended graphics array (XGA) (768×1024 pixel), and has a transparent electrode between an Ag electrode and a glass substrate. PDP333 corresponds to XGA and has no transparent electrode between an Ag electrode and a glass substrate.

Table 1 shows a measurement result of reflection spectrum difference $\Delta R(\lambda)$ and coloring degree (b *) by yellowing of three kinds of PDPs. The value of b * is preferably as small as possible, but, actually, the yellowing has no particular problem when b * is 2 or smaller. The PDPs have no problem as an image display device in the following conditions:

$\Delta R(\lambda)$ is about 3% or lower in PDP111 having a transparent electrode between the Ag electrode and the glass substrate and having a wide pixel interval;

$\Delta R(\lambda)$ is about 2% or lower in PDP222 having a transparent electrode between the Ag electrode and the glass substrate but having a narrow pixel interval; and $\Delta R(\lambda)$ is about 1% or lower in PDP333 having no transparent electrode.

Additionally, using a glass substrate for which $\Delta R(\lambda)$ exceeds 3% as the back-side glass substrate allows high-yield manufacturing of an image display device having high image display quality.

TABLE 1

| Δ R[%] | b* | | |
|---|---|---|---|
| | PDP 111 | PDP 222 | PDP 333 |
| 0.1 | 0.4 | 0.4 | 0.5 |
| 0.8 | 0.8 | 0.6 | 1.3 |
| 2.1 | 1.2 | 2.3 | 2.2 |
| 3.3 | 2.0 | 2.8 | 4.2 |
| 4.0 | 2.4 | 3.4 | 5.5 |

The advantage of the present invention is useful for not only a PDP but also an image display device having the structure where an Ag electrode is formed on a glass substrate having $Sn^{++}$ on its surface. This glass substrate is a glass substrate formed by the float method, for example.

INDUSTRIAL APPLICABILITY

The present invention provides an image display device that can suppress yellowing from occurring on a glass substrate manufactured by the float method even when an Ag electrode is formed on the glass substrate, and has high image display quality. The present invention provides an entirely high-yield manufacturing method of the image display device by efficiently selecting a glass substrate.

REFERENCE NUMERALS

1 PDP (Image display device)
2 Front substrate
3 Front-side glass substrate
4 Scan electrode
4b, 5b Bus electrodes (Ag electrodes)
5 Sustain electrode
6 Display electrode
7, 12 Dielectric layers
8 Protective layer
9 Back substrate
10 Back-side glass substrate
11 Address electrode (Ag electrode)
13 Barrier rib
14R, 14G, 14B Phosphor layers
15 Discharge space
21 Melting furnace
22 Float furnace
23 Glass ribbon
24 Molten tin
25 Atmosphere
26 Conveying roller
27 Slow cooling furnace

28 Cutter
29 Surface removing furnace
30 Etchant
32 Reflectance measuring device
100 Glass substrate

The invention claimed is:

1. A method of manufacturing an image display device having a front-side glass substrate and a back-side glass substrate, the front-side glass substrate and the back-side glass substrate being manufactured by a float method, the front-side glass substrate and the back-side glass substrate each having a surface on which an Ag electrode is to be formed, the method comprising:

measuring a reflectance of a surface of a glass substrate on which the Ag electrode is to be formed; and selecting whether the glass substrate is to be used as the front-side glass substrate or the back-side glass substrate based on the measured reflectance, wherein the measuring of the reflectance comprises measuring the reflectance at a wavelength maximizing a difference between a reflection spectrum at a wavelength of 200 nm~250 nm on the surface of the glass substrate on which the Ag electrode is to be formed and a reflection spectrum at a wavelength of 200 nm~250 nm at a part formed by removing no less than 15 μm~20 μm from the surface, and wherein the selecting of the glass substrate comprises using the glass substrate as the back-side glass substrate when the measured reflectance exceeds 5%.

* * * * *